(12) United States Patent
D'Hondt et al.

(10) Patent No.: US 11,999,118 B2
(45) Date of Patent: Jun. 4, 2024

(54) BELT CALENDER AND METHOD FOR MANUFACTURING PREIMPREGNATED COMPOSITES

(71) Applicant: KLIEVERIK HELI B.V., Oldenzaal (NL)

(72) Inventors: Arnold August Petronella Marie D'Hondt, Haps (NL); Johan Schenke, Hengelo (NL)

(73) Assignee: KLIEVERIK HELI B.V., Oldenzaal (NL)

( * ) Notice: Subject to any disclaimer, the term of this patent is extended or adjusted under 35 U.S.C. 154(b) by 66 days.

(21) Appl. No.: 17/426,694

(22) PCT Filed: Jan. 30, 2020

(86) PCT No.: PCT/NL2020/050049
§ 371 (c)(1),
(2) Date: Jul. 29, 2021

(87) PCT Pub. No.: WO2020/159366
PCT Pub. Date: Aug. 6, 2020

(65) Prior Publication Data
US 2022/0097320 A1    Mar. 31, 2022

(30) Foreign Application Priority Data
Feb. 1, 2019    (NL) .................................... 2022493

(51) Int. Cl.
*B29C 70/50*    (2006.01)
*B29C 43/22*    (2006.01)
(Continued)

(52) U.S. Cl.
CPC ............ *B29C 70/504* (2013.01); *B29C 70/54* (2013.01); *B29K 2105/0872* (2013.01)

(58) Field of Classification Search
CPC ....... B29C 70/504; B29C 39/16; B29C 41/28; B29C 70/50; B29C 43/228
See application file for complete search history.

(56) References Cited

U.S. PATENT DOCUMENTS

| 4,219,524 A | 8/1980 | Miller |
| 5,330,595 A * | 7/1994 | Held ...................... B29C 43/28 156/244.27 |

(Continued)

FOREIGN PATENT DOCUMENTS

| DE | 3420132 A1 | 12/1984 |
| JP | 2016132210 A | 7/2016 |

OTHER PUBLICATIONS

International Search Report and Written Opinion for the International Patent Application No. PCT/NL2020/050049, dated Apr. 14, 2020, 13 pages.
(Continued)

*Primary Examiner* — Matthew J Daniels
(74) *Attorney, Agent, or Firm* — KDW Firm PLLC (57) ABSTRACT

A belt calender for manufacturing preimpregnated composites includes a first roller, which is rotatable around its longitudinal axis, a first belt running at least partly around the first roller; and a second belt running in between the first roller and the first belt. The first belt and the second belt guide a feed of material between them. The belt calender includes auxiliary rollers which are rotatable around their longitudinal axes, and are arranged substantially parallel to the first roller around at least a part of a circumference thereof. The first and second belt run in between two adjacent ones of the plurality of auxiliary rollers, thereby defining a meandering path for the feed of material. A method for manufacturing preimpregnated composites by using such a belt calender.

15 Claims, 3 Drawing Sheets

(51) Int. Cl.
*B29C 70/54* (2006.01)
*B29K 105/08* (2006.01)

(56) References Cited

U.S. PATENT DOCUMENTS

| | | | |
|---|---|---|---|
| 5,445,701 A * | 8/1995 | Koba | B29C 70/504 |
| | | | 118/118 |
| 2014/0021021 A1 * | 1/2014 | Pero | B65G 15/34 |
| | | | 156/333 |
| 2016/0368184 A1 | 12/2016 | Nelson et al. | |
| 2017/0182685 A1 | 6/2017 | Xu et al. | |

OTHER PUBLICATIONS

International Preliminary Report on Patentability for the International Patent Application No. PCT/NL2020/050049, dated Aug. 12, 2021.

\* cited by examiner

BELT CALENDER AND METHOD FOR MANUFACTURING PREIMPREGNATED COMPOSITES

This is a national stage application filed under 35 U.S.C. § 371 of international application PCT/NL2020/050049, filed Jan. 30, 2020, which claims priority to Netherlands Patent Application No. NL 2022493, filed Feb. 1, 2019, the entirety of which applications are hereby incorporated by reference herein.

The invention relates to a belt calender for manufacturing preimpregnated composites, comprising a first roller, which is rotatable around its longitudinal axis, a first belt running at least partly around the first roller, and a second belt running in between the first roller and the first belt, wherein the first belt and the second belt are configured for guiding a feed of material between them.

Such a belt calender per se is known. The known belt calender works by supplying a material to be impregnated with a matrix material disposed thereon. The material to be impregnated can be a mat or ply of woven or non-woven fibers. The matrix material can be a thermoplastic material, or a material behaving as a thermoplastic material under a certain temperature and as a thermosetting plastic above said certain temperature. By running the material to be impregnated and the thermoplastic material disposed thereon in between the two belts, the tension force between the two belts creates a pressing force urging the belts together, especially where the belts run around the first roller. By means of the pressing force the matrix material is spread into the material to be impregnated, thereby impregnating the material. The resulting preimpregnated composite, also referred to as prepreg in the art, may be used in various manufacturing industries.

The belt calender of the known type however produces prepregs in which the matrix material is penetrated into the material to be impregnated to a limited extent only, meaning some inner parts of the material to be impregnated are not at all or not sufficiently provided with matrix material. As the performance of a finished product manufactured from the prepreg is dictated by the cooperation of the matrix material with the impregnated material, weak spots exist in the finished product where the matrix material has insufficiently penetrated into the material to be impregnated. Consequently, this known method of production is unsuitable for high performance industries such as the aerospace and automotive industry, where weak spots are unacceptable.

The invention has as its goal to improve the known belt calender, preferably so that prepregs can be manufactured which are suitable for high performance industries, such as the automotive and aerospace industry.

This goal is achieved by a calendar of the above described type, characterized by a plurality of auxiliary rollers, which are rotatable around their respective longitudinal axes, and are arranged substantially parallel to the first roller around at least a part of a circumference thereof, wherein the first and second belt and any material therebetween run in between two adjacent ones of the plurality of auxiliary rollers, thereby defining a meandering path for the feed of material. Preferably, said meandering path is defined or definable around at least a part of the circumference of the first roller.

The meandering path for the belts and the material therebetween creates changing compressive and shearing forces in the material between the belts, thereby effectively massaging the matrix material into the material to be impregnated. As a result, a better impregnation can be achieved. In particular the matrix material may be substantially evenly divided throughout the complete material to be impregnated, thereby leaving no weak spots in the finished prepreg. Therefore, the prepregs manufactured using such a belt calender may be of a higher quality, and may possibly be suitable for high performance industries.

The material to be impregnated may have uni-directional or bi-directional oriented fibers, or may have randomly oriented fibers, but in a particular embodiment comprises at least a material comprising uni-directional oriented fibers, which in particular have been shown to benefit from the aforementioned compressive and shearing forces. The matrix material may be supplied on one or on both sides of the material to be impregnated. The matrix material may be supplied as a foil, a molten liquid of matrix material or a powder, and/or may be applied using a roller coater, a knife coater, a coating head, a bath or a powder scattering device.

In particular the first roller may be a hollow roller, i.e. a drum. The first roller may be heated. The auxiliary rollers may be solid, however preferably they are hollow so that they may comprise heating means on their insides. Solid rollers have the advantage of deforming less under the same radial load. The first roller and/or the auxiliary rollers are preferably of cylindrical shape.

The first and auxiliary rollers being arranged substantially parallel to each other may mean that the longitudinal axes of the first and auxiliary rollers are arranged substantially parallel to each other.

The plurality of auxiliary rollers may comprise at least two auxiliary rollers. It is preferred that the belt calender has a total of 2-10 auxiliary rollers, preferably at least 3 auxiliary rollers. For example, the belt calender may have 5 or 6 auxiliary rollers.

The first roller and/or plurality of auxiliary rollers may be rotatable by the belts that may be driven in a transport direction of the feed of material. Alternatively and/or additionally, the first roller may be connected to first drive means of the belt calender for driving said first roller and/or one or more of the auxiliary rollers may be connected to second drive means of the belt calender for driving said one or more of the auxiliary rollers. The first and second drive means may be formed by one drive means, such that said one drive means drives both the first roller and said one or more auxiliary rollers, or may be separate drive means. Driving an auxiliary roller separately from the first roller allows the circumferential speeds of the first roller and auxiliary roller to differ and to thereby subject the belts to a circumferential speed at the auxiliary roller which is different from the circumferential speed of the first roller, which may help to compensate for form deformation of the belts and material during the calendering process.

Where more than two auxiliary rollers are provided, the two belts and any material therebetween may run in between each pair of adjacent auxiliary rollers to define the meandering path.

In particular, the first belt, the second belt and any material therebetween may run, in a transport direction of the feed of material, alternatingly along the inside and the outside of two adjacent ones of the auxiliary rollers as seen from the first roller.

The belts and material running alternatingly along the inside and the outside of adjacent auxiliary rollers effectively creates a meandering path which helps to achieve the massaging effect and thereby a thorough penetration of the matrix material into the material to be impregnated, and thereby a prepreg of a higher quality.

The meandering path may be defined at a location at a distance from (i.e. at least not in contact with) the first roller.

However, as mentioned, said meandering path is preferably defined or definable around at least a part of the circumference of the first roller. In this respect, 'defined' may in an embodiment imply that at least one of the auxiliary rollers is at a location urging the material between the first roller and this auxiliary roller. 'Definable' in this respect implies that at least one of the auxiliary rollers is provided with means for bringing this roller in such a position. In some embodiments, it may be preferred to ensure the auxiliary rollers to urge the material against the first roller, whereas for other embodiments, this may not be the case. An embodiment wherein the meandering path is definable around at least a part of the circumference of the first roller may thus provide increased flexibility as opposed to an embodiment wherein the meandering path is just defined around at least a part of the circumference of the first roller.

Preferably the belts and material run, as seen in a transport direction of the feed of material, along each consecutive auxiliary roller, alternatingly along the inside or the outside thereof.

The inside of an auxiliary roller may be defined as that part of the roller which faces the first roller. When said auxiliary roller rotates, a different part of the roller continuously faces the first roller and thereby constitutes the inside of it. Correspondingly the outside of an auxiliary roller may be defined as that part of the roller which faces away from the first roller. When the auxiliary roller rotates, a different part of the roller continuously faces away from the first roller and thereby constitutes the outside of it.

Where the belts and material run along the inside of an auxiliary roller, the belts therefore run between the first roller and said auxiliary roller. Therefore, each belt contacts a single roller, i.e. the first belt contacts said auxiliary roller and the second belt contacts the first roller. Where the belts and material run along the outside of an auxiliary roller, the belts run solely around the auxiliary roller, which is at that position disposed between the first roller and the belts. Therefore, the second belt contacts said auxiliary roller, whereas the first belt does not contact an auxiliary roller.

In one embodiment, the first belt, the second belt and any material therebetween runs, in a transport direction of the feed of material, along the first roller, and subsequently along the auxiliary rollers.

In other words, the material first contacts the first roller and afterwards contacts the auxiliary rollers. In this embodiment, the material may be at least not in contact with from the auxiliary rollers during the contact with the first roller, and the material may be at least not in contact with from the first roller during the contact with the auxiliary rollers. In this way, the material is first pretreated by the first roller, e.g. preheated, when the first roller comprises the hereafter discussed heating means, and subsequently massaged by the auxiliary rollers. However, alternative options are also possible.

In one embodiment of the belt calender according to the invention, the belt calender comprises heating means for heating at least one of the plurality of auxiliary rollers. The heating means may be disposed in a cavity of a hollow auxiliary roller.

The heated auxiliary roller may be used to heat the matrix material, which may thereby soften and/or flow more easily. This may achieve a higher degree of penetration of the matrix material into the material to be impregnated and thereby a prepreg of higher quality.

In a preferred embodiment of the belt calender according to the invention, at least one roller of the plurality of auxiliary rollers urges the first belt and the second belt and any material therebetween against the first roller. This may help forcing the matrix material into the material to be impregnated, thereby achieving a higher degree of penetration and thereby a prepreg of higher quality.

In particular, the at least one roller may be a roller along which the belts run on the inside of as seen from the first roller. In an embodiment, all auxiliary rollers along which the belts run on the inside of, urge the belts against the first roller. Alternatively, some, only one or none of the auxiliary rollers along which the belts run on the inside of, urge(s) the belts against the first roller.

Practically another one of the plurality of auxiliary rollers adjacent to the one of the plurality of auxiliary rollers is arranged at a distance from the first roller. When more than two auxiliary rollers are provided, the rollers may alternatingly urge the belts and any material therebetween against the first roller and be arranged at a distance from the first roller. The belts thereby run between the auxiliary rollers urging the belts against the first roller and the auxiliary rollers arranged at a distance from the first roller.

In particular, said another one of the plurality of auxiliary rollers may be a roller along which the belts run on the outside of as seen from the first roller.

At a distance may mean here that said another one of the plurality of auxiliary rollers is at least not in contact with the first roller.

The auxiliary rollers urging the belts against the first roller may be disposed at the same distance from the first roller as the other auxiliary rollers or closer to the first roller than the other auxiliary rollers.

Said one of the plurality of auxiliary rollers urging the belts and any material therebetween against the first roller may mean that said one of the plurality of auxiliary rollers exerts a force with its inside, i.e. its part facing the first roller, on the belts and the material in the direction of the first roller.

As the second belt runs between the first belt and the first roller and the material runs between the two belts, the first belt and the material may not be urged against the first roller directly, but only indirectly. More in particular, the first belt and the material may be urged against the first roller via the second belt that is in turn urged against the first roller directly.

In another preferred embodiment of the belt calender according to the invention, a radial position of at least one of the plurality of auxiliary rollers with respect to the first roller is adjustable. In other words, the distance, in particular the radial distance, of said at least one auxiliary roller from the first roller may be adjustable. The radial position of at least the auxiliary rollers along which the belts run on the outside of may be adjustable, so as to change the meandering path. The radial position of at least the auxiliary rollers urging the belts against the first roller may be adjustable, so as to adjust the force with which the belts are urged against the first roller. In some embodiments, auxiliary rollers that do not urge the belts against the first roller are not radially displaceable with respect to the first roller.

By increasing and decreasing the radial distance of said at least one of the plurality of auxiliary rollers, a straight section can be introduced or enlarged in the meandering path, respectively be removed or shortened. Such a belt calender may therefore advantageously make the meandering path adjustable. An adjustable path may be adapted to different types of material feeds, consisting of e.g. different materials or different amounts of material, so that the belt calender may perform optimally for each type of feed material.

Additionally or alternatively, by increasing the radial distance of said at least one of the plurality of auxiliary rollers, a force with which it urges the belts and any material therebetween against the first roller is adjustable. Accordingly, the belt calender may perform optimally for each type of feed material.

In yet another preferred embodiment of the belt calender according to the invention, the belt calender further comprises pre-heating means for pre-heating the first and/or second belt and/or the feed of material, arranged upstream of the first roller as seen in a transport direction of the feed of material.

The pre heating means may be used to directly or indirectly heat the feed of material, thereby softening the matrix material. This may enhance the penetration of the matrix material into the material to be impregnated. The heating means may use infrared radiation.

In yet another preferred embodiment of the belt calender according to the invention, the belt calender further comprises cooling means arranged downstream of the first roller as seen in a transport direction of the feed of material for cooling the feed of material.

Cooling the feed of material downstream of the first roller will set, i.e. harden, the matrix material which at that point is impregnated in the material to be impregnated, thereby allowing the cooled material to be handled more easily, for instance for cutting and/or packaging. In particular the cooling means may be configured for cooling the matrix material below its glass transition temperature. Additionally or alternatively, the cooling means may ease the detachment of the feed of material from the first and second belt.

Preferably the cooling means comprise at least one plate cooler, wherein preferably the cooling means comprise two plate coolers arranged on opposite sides of the first belt and the second belt. Such plate coolers offer the advantage that the feed of material may be cooled evenly, thereby reducing or avoiding deformations and/or internal stresses. As a result the completed prepreg may be substantially flat. The cooling means, particularly if configured to cool the material below its glass transition temperature, may aid in releasing the material from the belts. This is in particular useful in combination with a glass fiber reinforced Teflon belt.

In a practical embodiment of the belt calender according to the invention, the first belt and/or the second belt is an endless belt spanned across a system of return rollers defining a return path for said respective first or second belt, which return path runs free of the first roller. The first and/or second belt may or may not comprise a seem at which ends of the belts have been merged to form an endless belt. The return path running free of the first roller may mean that a belt following the return path remains at a distance from the first roller. Both of the return path and the meandering path are part of the complete loop of a single endless belt, so that any particular point on the belt follows the return path and the meandering path once in one complete revolution of said belt.

In yet another preferred embodiment of the belt calender according to the invention, the system of return rollers comprises a moveable roller for adjusting the tension force in said respective first or second belt.

By adjusting the tension force, a pressing force on the material between the two belts may be adjusted. This advantageously makes the belt calender adjustable to different types of material feeds, such as those consisting of different materials and/or materials in different quantities.

The belt calender according to the invention may comprise a waltz roller urging the first belt, the second belt and any material therebetween against the first roller with a waltz force.

In yet another preferred embodiment of the belt calender according to the invention, a or the tension force of the first belt and/or the second belt produces a pressing force on any material between the first belt and the second belt, wherein the pressing force is between 1.8-3.0 kg/cm$^2$. The pressing force is sometimes referred to in the art as 'belt pressure' and is a result of a tension in one or both belts and the specific configuration of the belt calender, including the size of its first roller. The pressing force is typically higher at auxiliary rollers than at the first roller, due to the larger circumference of the first roller. Unless otherwise indicated, the pressing force throughout this application relates to the pressing force at the first roller. It is known to use a pressing force of approximately 75-150 g/cm$^2$ and a waltz force of approximately 4-8 kg/cm$^2$, i.e. using a waltz force much higher than the pressing force is known. For larger penetration of the matrix material it is known to even further increase the waltz force while maintaining the pressing force, thereby making the difference between the waltz force and the pressing force even bigger. The applicant has however surprisingly found that contrary to common practice and expectations, greatly increasing the pressing force actually has the desired effect of promoting penetration of the matrix material into the material to be impregnated. In particular, increasing the pressing force approximately 20-30 times at the auxiliary rollers so, has proven to provide the desired effect. Without wishing to be bound by theory, it is believed that increasing the pressing force to above the waltz force leads to the desired results due to the massaging effect of the auxiliary rollers, because the massaging effect benefits from the increased pressing force.

The waltz roller may be disposed downstream of the plurality of auxiliary rollers as seen in the transport direction. Alternatively, the waltz roller may be one or more of the plurality of auxiliary rollers, in particular the last and/or first auxiliary roller as seen in the transport direction.

The first belt and second belt may be made or comprise any suitable material, such as for example a metal. In order to more easily release the prepreg from the first belt or the second belt, one or both of them may be a glass fiber reinforced Teflon belt. This effect is particularly important when the pressing force is increased as compared to the prior art, since the prepreg releases less easily from a prior art belt due to the increased pressing force. To achieve this advantage, it may be enough to provide the belts with an outer layer of Teflon, whereas the rest of the belt may be some other material. Although a release agent may be disposed between the belts and the material to facilitate release of the material, a glass fiber reinforced Teflon belt may not require any release agent disposed between the belts and the material. An advantage of not using a release agent is that it cannot end up in the finished product. Further, a glass fiber reinforced Teflon belt may offer the advantage of being particularly strong, so that it may offer sufficient strength at a relatively low thickness. The belts and material in between may cool more quickly due to the reduced thickness of the belt.

It is preferred to have the first roller have a diameter larger than at least one of and preferably all of the auxiliary rollers, preferably at least twice as large, more preferably at least three times as large, most preferably at least four times as large.

This increases the amount of changing compressive and shearing forces in the material between the belts around the circumference of the first roller, improving the impregnation with the calender.

The invention also relates to a method for manufacturing preimpregnated composites by using a belt calender as described above, comprising the step of feeding a feed of material between the first belt and the second belt.

The method may include one or more of the above-described features and offer the corresponding advantages, in any arbitrary combination.

In a particular embodiment of the method according to the invention, the belt calender comprises the moveable roller and/or the waltz roller, and the method further comprises adjusting the tension force so that the pressing force is larger than 2 kg/cm², preferably at least 2.5 kg/cm², more preferably approximately 3 kg/cm². This method may offer the advantage described above in relation to the pressing force.

In another embodiment of the method according to the invention, the first roller and the auxiliary rollers are driven to rotate at different circumferential speeds. This may help to compensate for form deformation of the belts and material during the calendering process.

The invention will be further explained with reference to the attached figures, wherein.

In all figures, the same elements are referred to using the same reference numerals.

Figure 1:
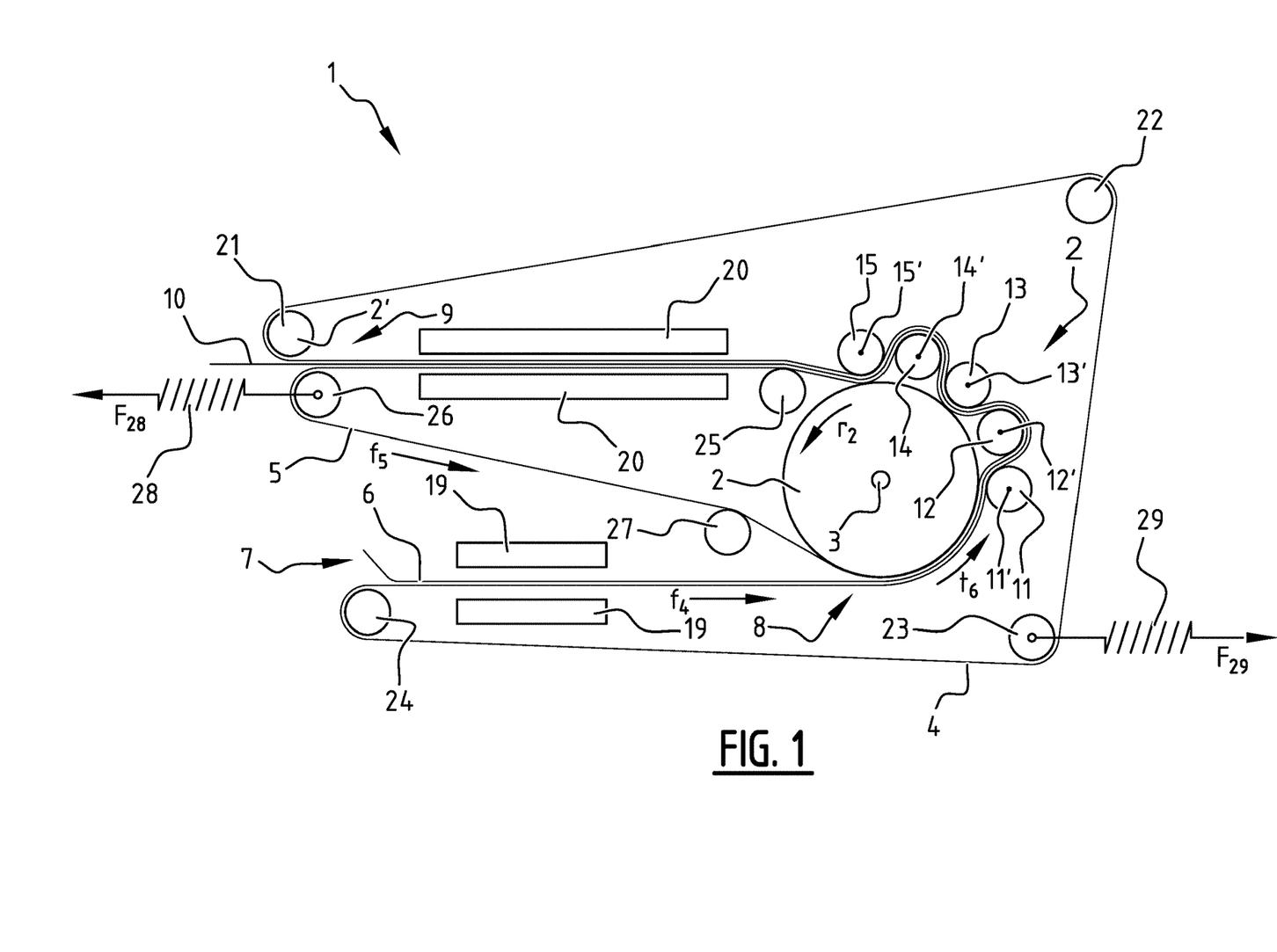
FIG. 1 shows a schematic representation of a side view of an embodiment of a belt calender according to the invention.

FIG. 1 shows a belt calender 1 for manufacturing preimpregnated composites. The belt calender 1 comprises a first roller 2 which is rotatable around its longitudinal axis 3. In this embodiment the first roller 2 is a drum. The belt calender 1 includes a first belt 4 which runs at least partly around the first roller 2, and a second belt 5 running in between the first roller 2 and the first belt 4. The first belt 4 and the second belt 5 are configured for guiding a feed of material 6 between them. The feed of material 6 initially comprises a material to be impregnated and a matrix material. The matrix material may be supplied on one side or on both sides of the material to be impregnated. As the feed of material 6 moves along the belt calender 1, the matrix material penetrates into the material to be impregnated, eventually resulting in a prepreg. The matrix material is usually a thermoplastic material, which may require softening by pre-heating in order to sufficiently penetrate into the material to be impregnated. For that reason the belt calender of this embodiment is provided with pre-heating means 19. In the embodiment shown the pre-heating means are constituted by two plate heaters 19 disposed on both sides of the first belt 4, however a single plate heater 19, especially below the first belt 4, may also be sufficient. Alternatively, other pre-heating means 19 may be employed. As the first roller 2 rotates in a rotation direction $r_2$, the two belts 4, 5 move with it in a feeding direction $f_4$ and $f_5$. In this specific embodiment, the feed of material 6 is transported by the first belt 4 from an infeed position 7 upstream of the first roller 2 in the feeding direction $f_4$ towards the first roller 2, where it is met by the second belt 2 at a starting location 8 for clamping the feed of material 6 between the two belts 4, 5. The feed of material 6 is from that starting location 8 clamped between the two belts 4, 5 which guide the feed of material 6, so that the feed of material follows the path of two belts 4, 5 around the first roller 2. The two belts 4, 5 separate at a separation location 9, thereby feeding out a finished feed of material 10, i.e. a prepreg. For the sake of clarity, the belts 4, 5 and the feed of material 6 have been drawn at distance from each other, whilst in reality they are in contact.

Figure 2:
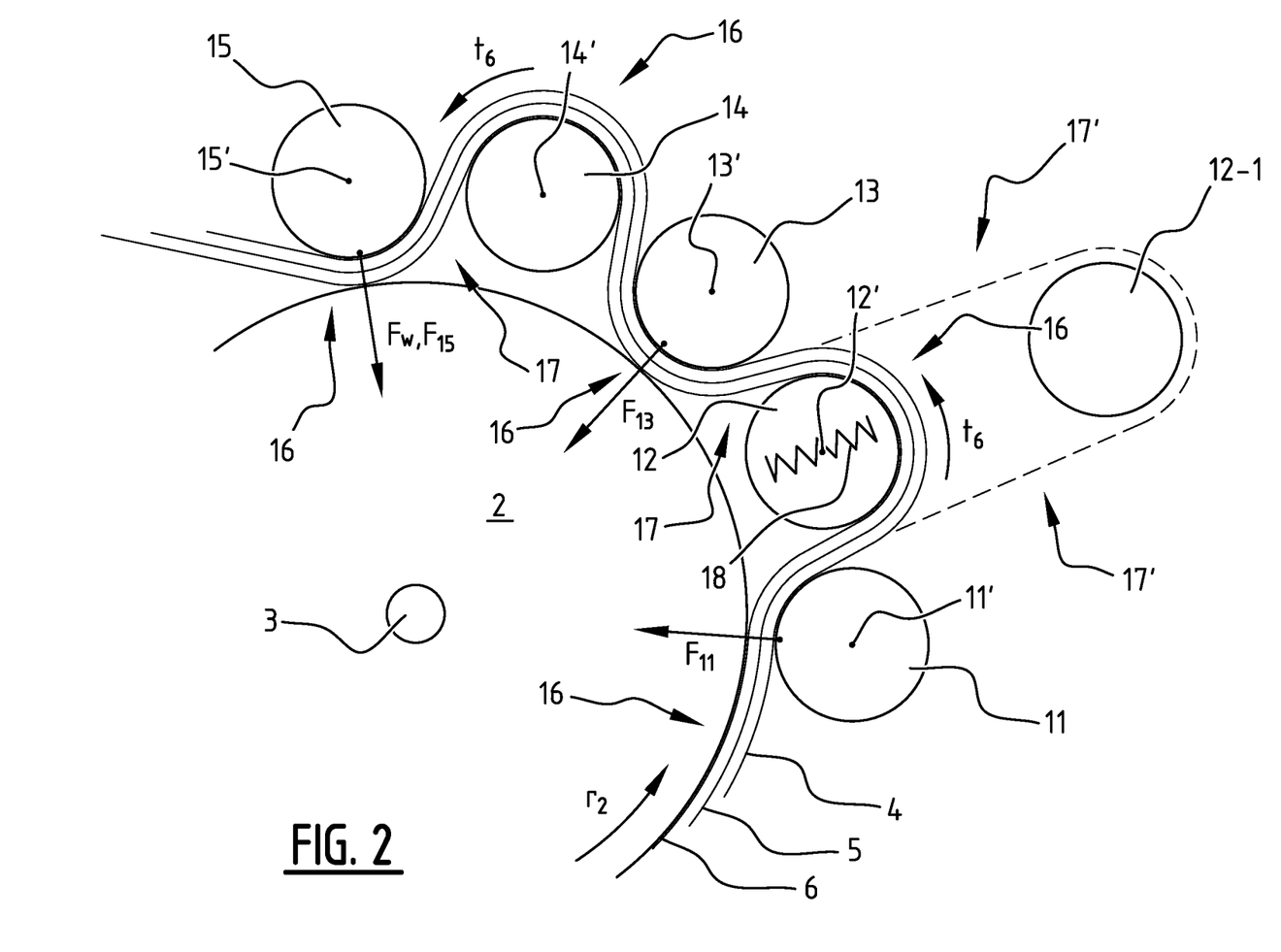
FIG. 2 shows an enlarged view of a part of FIG. 1.

According to the invention, the belt calender of FIG. 1 comprises a plurality of auxiliary rollers, in this case five auxiliary rollers 11, 12, 13, 14, 15. It is noted that the belt calender could also comprise another number of auxiliary rollers 11, 12, 13, 14, 15, such as any number of auxiliary rollers 11, 12, 13, 14, 15 ranging from for example two to six. The auxiliary rollers 11, 12, 13, 14, 15 are arranged substantially parallel to the first roller 2 around a part of its circumference. This is shown in FIGS. 1 and 2 by longitudinal axes 11', 12', 13', 14', 15' of the auxiliary rollers 11, 12, 13, 14, 15, which are arranged substantially parallel to the longitudinal axis 3 of the first roller 2.

More particularly, the auxiliary rollers 11, 12, 13, 14, 15 are arranged in a part of the circumference of the first roller 2 in an area where also the first and second belt 4, 5 run. The first and second belt 4, 5 run together,—possibly with the feed of material 6 disposed in between—in between two adjacent auxiliary rollers 11, 12, 13, 14, 15, see e.g. pairs of auxiliary rollers 11, 12; 12, 13; 13, 14; 14, 15. The path along which the two belts 4, 5 and any material in between therefore run is meandering, meaning that it makes a series of at least one relatively sharp bend 16. Consequently, the meandering path moves towards and away from the first roller repeatedly. A relatively sharp bend 16 herein may mean that the bend has a smaller radius than the first roller 2. For that reason, at least one of the auxiliary rollers 11, 12, 13, 14, 15 may have a radius which is smaller than the radius of the first roller 2. As can be seen best in FIG. 2, when following the first belt 4 and the second belt 5 in the their respective feed directions $f_4$, $f_5$ defining a transport direction $t_6$ for the feed material in the same direction, the first belt 4 and the second belt 5 run alternatingly along the inside of an auxiliary roller 11, 13, 15 and on the outside of an auxiliary roller 12, 14. The meandering path thereby runs in a series of relatively sharp bends 16 around the auxiliary rollers 11, 12, 13, 14, 15. A meandering path like this creates changing compressive and shearing forces exerted onto the feed of material 6 transported between the belts 4, 5, thereby effectively massaging the matrix material into the material to be impregnated. The relatively sharp bends 16 in the meandering paths are in this specific embodiment separated by straight sections 17. Some of the straight sections 17 may be lengthened or shortened, introduced or removed by moving at least one of the auxiliary rollers 11, 12, 13, 14, 15 radially towards or away from the first roller. This concept is illustrated in FIG. 2, where auxiliary roller 12 is also drawn in a dotted line as auxiliary roller 12-1 moved radially further away from the first roller 2. Therefore, the straight sections 17' of the meandering path are longer than original straight sections 17 between auxiliary roller 12 and its adjacent auxiliary rollers 11, 13. By altering the positions of the auxiliary rollers 11, 12, 13, 14, 15, some or all of the straight sections 17, which run substantially in a radial direction with respect to the first roller 2, may be removed completely. When no straight sections 17 are present, they may be introduced by moving at least one of the auxiliary rollers 12, 14 along which the belts 4, 5 run on the outside of, away from the first roller 2. As is shown by forces $F_{11}$, $F_{13}$, $F_{15}$ (FIG. 2) auxiliary roller 11, 13, 15 of the plurality of auxiliary rollers of the belt calender 1 of this embodiment urge the first belt 4 and the second belt 5 and any material therebetween against the first roller 2. Depending on the desired performance of the belt calender, one, some or all of the auxiliary rollers 11, 13, 15 may be disposed at a larger distance from the first roller 2, so that they do not urge the belts 4, 5 against the first roller 2. The urging force of the rollers 11, 13, 15 introduced above, enhances the massaging effect described above, thereby ultimately leading to a more thorough impregnation. Although multiple auxiliary rollers 11, 13, 15 are shown to urge the first 4 and second belt 5 and the feed of material 6 against the first roller 2, a single auxiliary rollers could also be used to urge the belts 4, 6 and material 6. In particular, any of the auxiliary rollers 11, 13, 15 along which the belts 4, 5 run on the inside of, in any combination, may be used to urge the belts 4, 5 and material 6 against the first roller 2. In contrast, the auxiliary rollers 12, 14 along which the belts 4, 5 run on the outside of, which are adjacent said auxiliary rollers 11, 13, 15, are arranged at a distance from the first roller 2.

In the shown embodiment, the belt calender 1 also includes heating means 18 (see FIG. 2) for heating at least one of the plurality of auxiliary rollers 11, 12, 13, 14, 15. While only auxiliary roller 12 is in this case shown to be heated using the heating means 18, the invention also concerns multiple heated auxiliary rollers 11, 12, 13, 14, 15 using the same or separate heating means 18.

The belt calender 1 of this embodiment also includes cooling means 20 arranged downstream of the first roller 2 as seen in the transport direction $t_6$ of the feed of material 6 for cooling the feed of material 6. As an example, the cooling means 20 may comprise two plate coolers 20 arranged on opposite sides of the belts 4, 5, but one plate cooler 20 may also be sufficient. Using the cooling means 20, the material between the two belts 4, 5 can be cooled quickly and/or evenly.

In this embodiment the two belts 4, 5 are endless belts 4, 5, which are spanned across a system of return rollers 21, 22, 23, 24, 25, 26, 27. The return rollers 21, 22, 23, 24, 25 associated with the first belt 4 define a return path for the first belt 4, which runs free of the first roller 2. Accordingly, the first belt 4 forms a continuous loop around the first roller 2, following the meandering path and the return path. As a result, the first belt 4 may be driven continuously as long as desired. Similarly, the return rollers 25, 26, 27 associated with the second belt 5 define a return path for the second belt 5, which runs free of the first roller 2. Accordingly, the second belt 5 forms a continuous loop around the first roller 2, following the meandering path and the return path. As a result, the second belt 5 may be driven continuously as long as desired. It is noted that the return rollers 21, 22, 23, 24, 25, 26, 27 are distinct from the auxiliary rollers 11, 12, 13, 14, 15, as the return rollers 21, 22, 23, 24, 25, 26, 27 do not contribute to the meandering path and/or do not contribute to impregnating the material to be impregnated. In stead, the return rollers 21, 22, 23, 24, 25, 26, 27 merely guide the belts 4, 5 in a closed loop through the return path, thereby passing the pre-heating means 19 and the cooling means 20 if desired. The return rollers 21, 22, 23, 24, 25 for the first belt 4 include one moveable roller 23 for adjusting the tension force in the first belt 4. Similarly, the return rollers 25, 26, 27 for the second belt 5 include one moveable roller 26 for adjusting the tension force in the second belt 5. The moveable return rollers 23, 26 can be moved in order to lengthen or shorten the return path of their respective belts 4, 5. Lengthening the return path increases tension in the respective belt 4, 5, whereas shortening the return path decreases tension in the respective belt 4, 5. Practically, the moving return rollers 26, 23 are held in position by cylinders 28, 29, respectively, which are configured for continuously providing an adjustable force $F_{28}$, $F_{29}$ respectively. By means of the adjustable forces $F_{28}$, $F_{29}$ associated with the moveable return rollers 26, 23 the position of the rollers 26, 23 may be held so that a constant but adjustable tension exists in each belt 4, 5. The tension force in the belts 4, 5 produces a pressing force on any material therebetween. The embodiment of FIG. 1 also includes a waltz roller 15 urging the first belt 4, the second belt 5 and any material therebetween against the first roller 2 with a waltz force $F_w$. Although in this case the waltz roller 15 is one of the plurality of auxiliary rollers 11, 12, 13, 14, 15, a separate waltz roller may also be provided. It is advantageous of the waltz roller 15 is either the last of the auxiliary rollers 11, 12, 13, 14, 15 or arranged downstream of the auxiliary rollers 11, 12, 13, 14, 15. Alternatively the waltz roller may be the first of the auxiliary rollers. As explained above, tension in the first 4 and/or second belt 5 produces a pressing force on any material between the belts 4, 5. Therefore, the pressing force aids in the penetration of the matrix material into the material to be impregnated. In the embodiment shown, which also corresponds to an embodiment of the method according to the invention, the pressing force exceeds the waltz force $F_w$. Due to the meandering path, the pressing force changes in magnitude and direction, so that increasing the pressing force increases the massaging effect of the meandering path, thereby causing a more thorough penetration. The first belt 4 and the second belt 5 are in this case glass fiber reinforced Teflon belts 4, 5.

Figure 3:
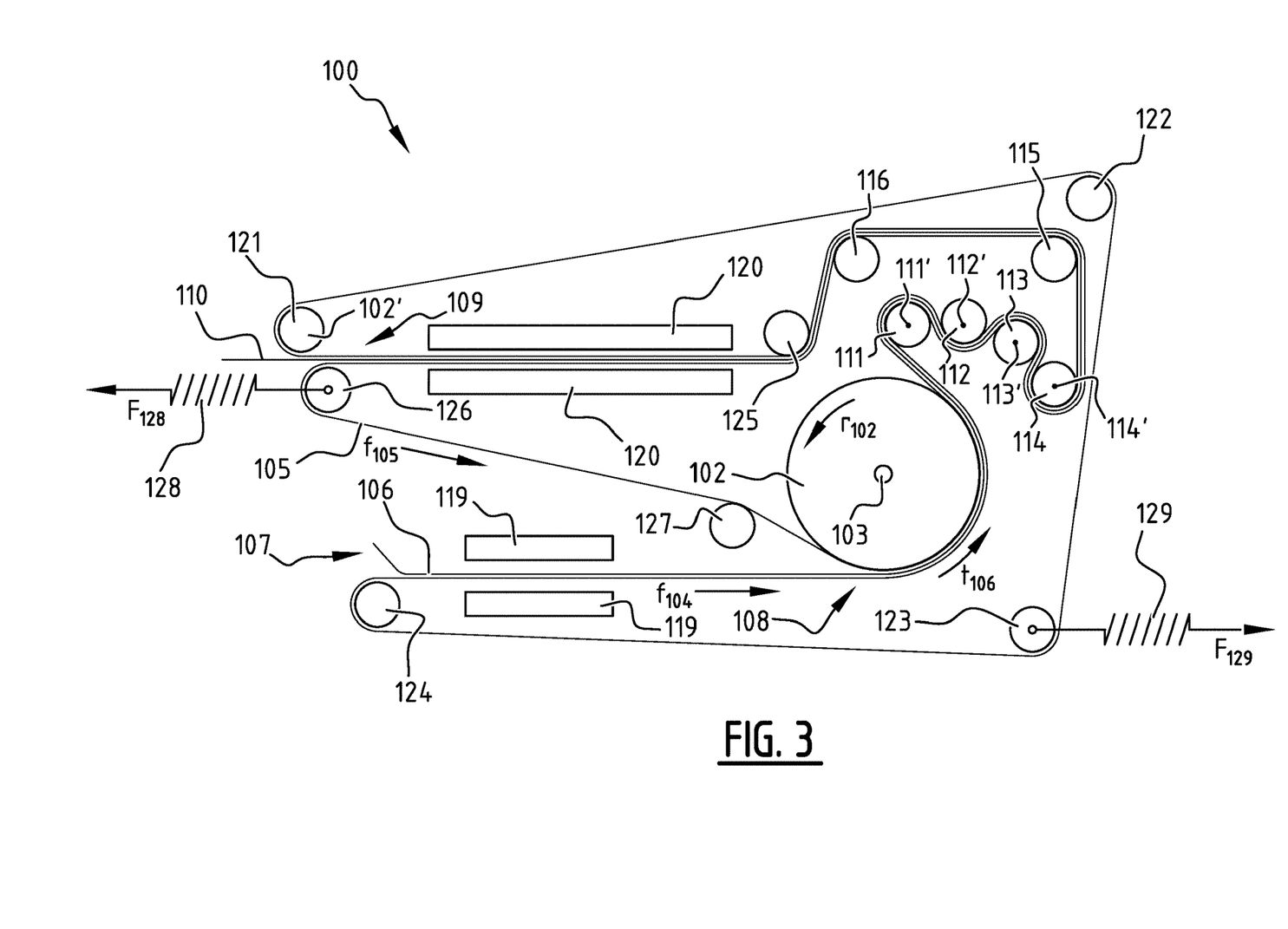
FIG. 3 shows a schematic representation of a side view of another embodiment of a belt calender according to the invention.

FIG. 3 shows another belt calender 100 for manufacturing preimpregnated composites. This belt calender 100 is somewhat similar to the belt calender 1 according to FIG. 1, but differs in the arrangement of the auxiliary rollers 111-114 and comprises additional return rollers. Elements in FIG. 3 which are similar to elements of the belt calender 1 in FIG. 1 (i.e. the elements designated by reference numbers 2-9, 19-29) are designated in FIG. 3, increased by 100 (e.g. first roller 2 becomes first roller 102), and will only be described in as far as they might be relevant for distinguishing the difference between the belt calenders 1 and 100.

The belt calender of FIG. 3 comprises a plurality of auxiliary rollers such as, in this case, four auxiliary rollers 111, 112, 113, 114, arranged substantially parallel to and spaced apart from the first roller 102, of which the longitudinal axes 111', 112', 113', 114' are arranged substantially parallel to the longitudinal axis 103 of the first roller 102. The auxiliary rollers 111, 112, 113, 114 are arranged in an area where also the first and second belt 104, 105 run.

In the direction of transport $f_{104}$, $f_{105}$, the first and second belt 104, 105 run together—with the feed of material 106 disposed in between—along the first roller 102, running free from the auxiliary rollers 111, 112, 113, 114, and subsequently along a meandering path between the auxiliary rollers 111, 112, 113, 114, in a direction opposite to the direction $r_{102}$, running free from the first roller 102. The meandering path creates an effect similar to the meandering path created by the auxiliary rollers 11, 12, 13, 14, 15 of the belt calender 1 according to FIG. 1.

In an embodiment, one, more or all of the auxiliary rollers 111, 112, 113, 114 may be moveable to a position in which the one, more or all of the auxiliary rollers 111, 112, 113, 114 are arranged around the first roller 102, and possible urge the first belt 104 and second belt 105 and any possible material 106 in between against the first roller 102.

In addition to the return rollers 121, 122, 123, 124, 125, 126, 127, the belt calender 100 also comprises return rollers 115, 116, in order to guide the first belt 104 and second belt 105 towards the separation location 109, accommodating for the reversed order of passage of the auxiliary rollers 111, 112, 113, 114 as compared to the belt calender 1 of FIG. 1. These additional return rollers 115, 116 are also distinct from the auxiliary rollers 111, 112, 113, 114. The return rollers 115, 116 do not contribute to the meandering path. The contribution of the return rollers 115, 116 to the impregnation of the material is at least minor with respect to the contribution by the auxiliary rollers 111, 112, 113, 114 (e.g. may originate from rest heat present in the material) but may even be negligible.

Although the invention has been explained with reference to particular examples or embodiments, it is not limited thereto. In stead, the invention also concerns the subject matter covered by the claims which now follow.

The invention claimed is:

1. A belt calender for manufacturing preimpregnated composites, comprising:
    a first roller, which is rotatable around its longitudinal axis;
        a first belt running at least partly around the first roller; and
        a second belt running in between the first roller and the first belt,
    wherein the first belt and the second belt are configured for guiding a feed of material between them,
    wherein a plurality of auxiliary rollers, which are rotatable around their respective longitudinal axes, are arranged substantially parallel to the first roller around at least a part of a circumference thereof,
    wherein the first and second belt and any material therebetween run in between two adjacent ones of the plurality of auxiliary rollers, thereby defining a meandering path for the feed of material,
    wherein the first belt, the second belt and any material therebetween runs, in a transport direction of the feed of material:
        alternatingly along the inside and the outside of two adjacent ones of the auxiliary rollers as seen from the first roller, and
        along the first roller, and subsequently along the auxiliary rollers, and
    wherein the first roller is a heated roller and has a diameter larger than the auxiliary rollers, such that the material between the first and second belts is preheated by the first roller and subsequently massaged by the auxiliary roller.

2. The belt calender according to claim 1, wherein the meandering path is defined or definable around at least a part of the circumference of the first roller.

3. The belt calender according to claim 1, wherein the meandering path is definable around at least a part of the circumference of the first roller.

4. The belt calender according to claim 1, wherein at least one of the plurality of auxiliary rollers is a heated roller.

5. The belt calender according to claim 1, wherein at least one of the plurality of auxiliary rollers urges the first belt and the second belt and any material therebetween against the first roller.

6. The belt calender according to claim 5, wherein another one of the plurality of auxiliary rollers adjacent to the one of the plurality of auxiliary rollers is arranged at a distance from the first roller.

7. The belt calender according to claim 1, wherein a radial position of at least one of the plurality of auxiliary rollers with respect to the first roller is adjustable.

8. The belt calender according to claim 1, further comprising an infrared radiator for pre-heating the first and/or second belt and/or the feed of material, arranged upstream of the first roller as seen in a transport direction of the feed of material.

9. The belt calender according to claim 1, further comprising cooling means arranged downstream of the first roller as seen in a transport direction of the feed of material for cooling the feed of material.

10. The belt calender according to claim 9, wherein the cooling means comprise at least one plate cooler.

11. The belt calender according to claim 1, wherein the first belt and/or the second belt is an endless belt spanned across a system of return rollers defining a return path for said respective first or second belt, which return path runs free of the first roller.

12. The belt calender according to claim 11, wherein the system of return rollers comprises a moveable roller for adjusting the tension force in said respective first or second belt.

13. The belt calender according to claim 1,
    wherein a tension force of the first belt and/or the second belt produces a pressing force on any material between the first belt and the second belt,
    wherein the pressing force is between 1.8-3.0 kg/cm$^2$.

14. The belt calender according to claim 1, wherein the first belt and/or the second belt is a glass fiber reinforced polytetrafluoroethylene belt.

15. The belt calender according to claim 1, wherein the plurality of auxiliary rollers comprises 2-10 auxiliary rollers.

* * * * *